C. T. JEFFRIES.
Car Spring.
No. 97,645. Patented Dec 7, 1869.
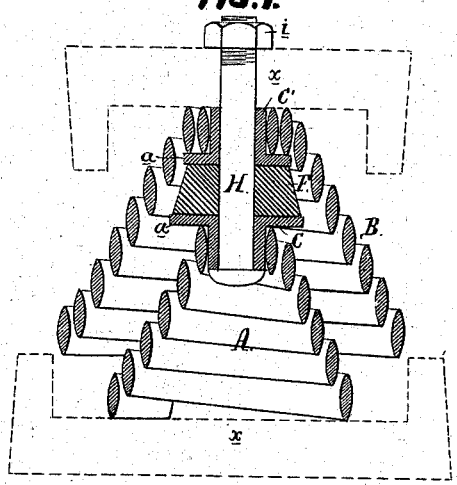
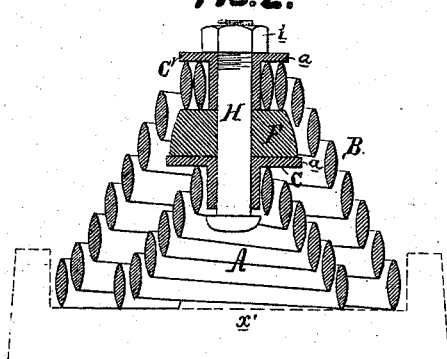
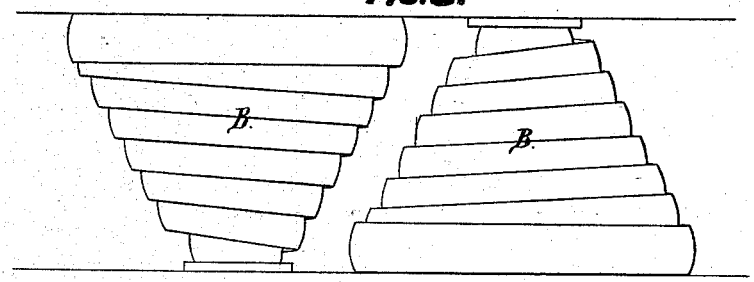
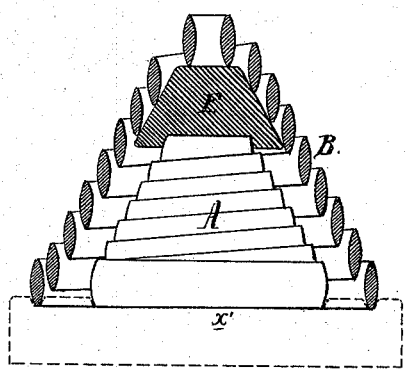

UNITED STATES PATENT OFFICE.

CHARLES T. JEFFRIES, OF PHILADELPHIA, PENNSYLVANIA.

IMPROVED CAR-SPRING.

Specification forming part of Letters Patent No. 97,645, dated December 7, 1869.

*To all whom it may concern:*

Be it known that I, CHARLES T. JEFFRIES, of Philadelphia, county of Philadelphia, State of Pennsylvania, have invented an Improved Car-Spring, of which the following is a specification.

My invention consists of a conical spring, composed of two or more conical coils arranged in nests, or one within the other, with blocks of rubber or other equivalent elastic material interposed between them in the manner fully described hereinafter, the whole forming a light, economical, and compact spring of great elasticity, which is especially applicable to cars, although it can be used wherever ordinary elliptic or other steel springs are employed.

My invention also consists in the combination, with the said spring, of certain flanged tubes for retaining the rubber in its place, and also of a certain bolt for uniting together the different members of the spring.

In the accompanying drawings, Figure 1 is a sectional view of my improved car-spring; Fig. 2, the same as it appears when partially compressed; Fig. 3, a view of two of the springs arranged side by side, and Fig. 4 a sectional view of a modification.

A represents a conical steel spring, and B a similar spring of somewhat larger size, which is fitted over the spring A in the manner best observed in Fig. 1, or so that there shall be sufficient space between the said springs to permit each of them to act independently without interfering with the other. The coils at the apex of each of these springs are wound one within the other in such a manner as to present a flat surface above and below, and so as to form a circular opening in the center of each spring for the reception of short tubes C and C', each of which is furnished at one end with a flange, *a*, the flange of the tube C resting upon the top of the spring A, and that of the tube C' against the under side of the spring B, and between these flanges is introduced a slab or block, F, of rubber, gutta-percha, or equivalent elastic material, held in its place by means of a vertical bolt, H, which passes through it and through the tubes C and C'.

In some cases, when it is desirable that the bolt H should bind the several members of the spring firmly together, the tube C' may be reversed, as shown in Fig. 2, so that its flange *a* may rest upon the top of the upper spring, and the nut *i* of the bolt be screwed down upon it. In this case the rubber is brought in direct contact with the under side of the spring B, which, however, is so flattened as to afford a good bearing-surface.

Fig. 1 represents the spring fully expanded, and Fig. 2, the same as it appears when sustaining a load, both of the springs, A and B, resting, in the latter instance, upon the lower bearing-surface X, and the spring A being compressed by pressure exerted through the rubber slab or block F, and not through the bolt H, as the latter is arranged to slide freely through the sleeve C, so as to permit the yielding and compression of the rubber to any required extent.

The above spring can be used wherever ordinary elliptic or other steel springs are employed, but is especially applicable as a car-spring, it possessing for this latter purpose several important advantages, among which may be enumerated its compactness, its great elasticity in proportion to its size and weight, the fact that it is self-sustaining, having no tendency to sway laterally, owing to its extended base, and that it can be used without a box, all that is required being flat bearing-surfaces above and below, or simple cast-iron shoes, such as are represented at *x* and *x'* in the drawings.

It may sometimes be found advisable to use two or more of the improved springs between the same bearing-surfaces, in which case they can be arranged side by side very compactly by inverting the alternate ones, in the manner shown in Fig. 3.

Although I prefer to use the central bolt H and flanged tubes C and C' in connection with the spring, as before described, yet either or both of them can be dispensed with without departing from my invention. In Fig. 4, for instance, is represented the spring as it would appear with the rubber interposed directly between the coils, without using either the flanged tubes or bolt.

I do not desire to confine myself to the use of two conical springs with interposed rubber, as, when a greater degree of elasticity is required, it may be found advisable to arrange three, four, or even a greater number of springs, in nests, or one within the other, with blocks of rubber introduced between all of them.

The springs also, instead of being formed of steel, of the flat oblong section shown, may be made of round or square wire or rods, although the former is to be preferred.

I claim—

1. A conical spring composed of two or more conical coils, arranged in nests, or one within the other, with blocks of rubber or equivalent elastic material interposed between them, substantially in the manner and for the purpose described.

2. In combination with the said conical spring, the flanged tubes C and C', for the purpose specified.

3. In combination with the said spring, a bolt, H, for the purpose set forth.

In testimony whereof I have signed my name to this specification in the presence of two subscribing witnesses.

CHARLES T. JEFFRIES.

Witnesses:
 JOHN WHITE,
 HARRY SMITH.